Patented June 17, 1930

1,764,600

UNITED STATES PATENT OFFICE

WEBSTER E. BYRON BAKER, OF YORK HAVEN, PENNSYLVANIA

SULPHITE WASTE-LIQUOR PRODUCT AND PROCESS OF MAKING SAME

No Drawing.   Application filed April 7, 1923.  Serial No. 630,604.

The principal object of the present invention is to provide an economical and commercially practical process for converting neutralized and concentrated light liquor or sulphite waste liquor into an extract useful for the treatment of leather and for various other purposes in the arts and which is a sodium compound of sulphite cellulose extract (sodium lignosulphonate).

In this connection it may be said that the presence of lime in a tanning extract has been held to be injurious to leather and this is true of sulphur dioxide present as sulphite in these extracts, so that it is a further object of the invention to avoid the presence of lime and of sulphur dioxide as sulphite in the product of the process.

The product is sodium lignosulphonate and it is substantially devoid of loosely combined sulphur dioxide or, in other words, contains a very small amount of sulphur dioxide as sulphite; and it may be acidified with acetic acid or equivalent acid and since no precipitation takes place there are in the solution four compounds, sodium lignosulphonate, free lignosulphonic acid, acetic acid and sodium acetate. The free lignosulphonic acid and the acetic acid are the principal operating compounds in the action on hides, for example, as the free lignosulphonic acid is gradually used up, more is created at the expense of the sodium lignosulphonate by the functioning of the acetic acid until equilibrium is reached, and the acetic acid functions as the plumping agent, causing the hides to swell and readily absorb the tanning agents present in the solution and in this sense the acetic acid acts similarly to the acidity present in usual tanning solutions.

In the practice of the invention the light liquor (sulphite waste liquor) neutralized by lime as hereinafter set forth and concentrated to a density of about 30° Baumé or until it contains about 50% dry matter, although I do not limit the invention in all cases to any particular resultant concentration, is stirred thoroughly with zeolite, natural or artificial, in granular form. Zeolite is sodium aluminium silicate and it has the property of re-acting with concentrated sulphite cellulose extract in such a manner that the calcium contained therein is removed and combined with the zeolite to make calcium aluminium silicate while the sodium from the zeolite combines with the acidic portions of the sulphite cellulose extract making sodium lignosulphonate. In this manner practically all of the lime is removed from the extract. The concentrated extract (sodium lignosulphonate) is now filtered from the granular changed zeolite. The extract may now be acidified to the desired degree with an acid having a relatively low dissociation constant, for example, acetic acid. The prepared extract can be employed to advantage in other manufactures and for other uses, among which reference may be made to the use as a mordant in the application of basic dye stuffs where tannic acid is used.

To the light liquor (sulphite waste liquor) there may be added milk of lime until the hydrogen ion concentration of the liquor is pH=9. There may also be added at this stage a small quantity of barium or strontium hydroxide solution and this can well be done in the last part of the neutralization procedure. The purpose is to precipitate as completely as possible any sulphuric acid ions present as sulphates and to remove the small quantity of sulphurous acid ions still present as sparingly soluble calcium sulphite. The last procedure is appropriate when it is desirable to remove the ions referred to as completely as possible and when it is essential that scale deposition or scale formation on the tubes and heating surfaces of the apparatus used in the subsequent concentration process be reduced as much as possible. If purity of the product may be disregarded it is possible to commercially operate without the addition of barium or strontium or both. The filtration and concentration of the neutralized light liquor may be effected as described in my application, Serial No. 539,284, that is to say, by subjecting it to sedimentation in any known sedimentation or thickening apparatus or simply in a tank for a sufficient time to settle the major portion of the larger particles. The supernatant liquor is drawn off and passed through a filter capable of holding the finest precipitates. This procedure is not limited to the employment of any particular form of filtration apparatus but in most cases good results are attained by the use of a high speed centrifugal of the imperforate basket or bowl type, which discharges the clear liquid from the basket or bowl without passing it through the cake, which is precipitated in a compact mass on the side of the bowl or basket while the filtrate flows over the top of the basket or bowl or out at the bottom. The resulting clear liquor is concentrated to about 50% solids content without decomposition. Decomposition is prevented by avoiding and minimizing the exposure of the liquid to high temperature, particularly as the concentration progresses. While any type of apparatus or method of obtaining these conditions may be employed, still it will be found most advantageous and economical to do this in a multiple effect vacuum evaporator, and of these the rapid film type is most desirable. The evaporator may be constructed of cast iron with narrow steel tubes. No appreciable increment in iron content will be experienced if the rapid film type is used.

While in all cases not essential, good results are attained by collecting the waste or light liquors prior to neutralization and while still boiling hot and filtering out fibers and solid materials in suspension and then pumping them while still hot through a fine spray nozzle or nozzles into the air under sufficient pressure to produce a mist. When this is done gaseous impurities or components are volatilized and organic compounds are oxidized.

The changed zeolite (calcium aluminium silicate) may be regenerated for re-use by washing or stirring it with a strong solution of sodium chloride or by allowing a strong solution of sodium chloride to pass through a bed of the changed zeolite (calcium aluminium silicate). The result is that the calcium is extracted as calcium chloride and sodium aluminium silicate is formed. Instead of sodium chloride use may be made of its equivalent, potassium chloride. In other words, alkali chloride (halide) is used in connection with zeolite in the process.

It will be obvious to those skilled in the art that modifications may be made in details of procedure without departing from the spirit of the invention which being of a chemical nature is entitled to the range of equivalents appropriate to that class of inventions, and which is not limited otherwise than as the appended claims and the prior art may require.

I claim:

1. The process of making sodium lignosulphonate from waste sulphite liquor which comprises neutralizing the light liquor until the hydrogen ion concentration is pH=9, filtering the basic liquor and concentrating it to make a concentrated liquid extract having its alkaline constituent of the alkali earth group and containing comparatively little sulphur dioxide as sulphite, and treating the concentrated liquor with zeolite for the production of sodium lignosulphonate.

2. A sulphite waste liquor product being sodium lignosulphonate acidulated with acetic acid and comprising sodium lignosulphonate, free lignosulphonic acid, acetic acid and sodium acetate, substantially as described.

3. In the process of making sodium lignosulfonate which comprises the production of a product containing calcium by neutralization and concentration of waste sulphite liquor, the step which comprises the removal of calcium therefrom by interchange with the sodium of a zeolite.

4. In the process of making sodium lignosulfonate which comprises the production of a product containing calcium by neutralization and concentration of waste sulphite liquor, the step which comprises the removal of calcium therefrom by interchange with the sodium of a zeolite, and recovering the sodium lignosulfonate and acidifying it with an organic acid having a relatively low dissociation constant.

WEBSTER E. BYRON BAKER.